United States Patent [19]

Weible

[11] 4,207,755

[45] Jun. 17, 1980

[54] UNIVERSAL JOINT FOR TRANSMITTING TORQUE FROM ONE SHAFT TO ANOTHER

[75] Inventor: Warren W. Weible, Defiance, Ohio

[73] Assignee: The Zeller Corporation, Defiance, Ohio

[21] Appl. No.: 962,241

[22] Filed: Nov. 20, 1978

Related U.S. Application Data

[63] Continuation-in-part of Ser. No. 744,885, Nov. 24, 1976, abandoned.

[51] Int. Cl.$^2$ .............................................. F16D 3/52
[52] U.S. Cl. ................................ 64/15 B; 64/15 C; 64/27 B; 64/27 C
[58] Field of Search ................. 64/15 R, 15 C, 15 B, 64/27 R, 27 C, 27 CT, 27 NM, 27 B

[56] References Cited

U.S. PATENT DOCUMENTS

| 3,068,666 | 12/1962 | Sabadash | 64/15 R |
| 3,448,591 | 6/1969 | Spyra | 64/15 R |
| 4,089,190 | 5/1978 | Worgan et al. | 64/1 S |

FOREIGN PATENT DOCUMENTS

| 566254 | 8/1957 | Italy | 64/15 R |
| 590261 | 4/1959 | Italy | 64/15 R |
| 601100 | 12/1959 | Italy | 64/15 R |

OTHER PUBLICATIONS

Berg et al., "Advanced Fiber-Resin Composites," Machine Design, Apr. 1, 1971.
Chambers, "Low Cost High Performance Carbon Fibers," Mechanical Engineering, Dec. 1975.
"A Sporting Try for Fiber Reinforced Advanced Composites," Materials Engineering, Oct. 1972, pp. 35-37.

*Primary Examiner*—Ira S. Lazarus
*Attorney, Agent, or Firm*—Allen D. Gutchess, Jr.

[57] ABSTRACT

A universal joint is provided and particularly a universal joint of the constant velocity type. The joint is particularly intended for use in drive trains of front wheel drive vehicles. The universal joint includes a pair of members attachable to each of two shafts to be joined, with a curved elongate bridging element connecting the two members. The bridging element extends in a curve from 180° up to several turns in progressing from one of the members to the other. The bridging element is designed to have high resistance to bending in both a direction parallel to and a direction perpendicular to axes of the two connected shafts, when they are aligned. At the same time, the bridging element is designed to have low resistance in torsion or to twisting. These characteristics enable the bridging element to transmit torque from one shaft to the other and yet enable the bridging element to twist or flex so as to accommodate angular misalignment between the two shafts. In a preferred form, the bridging element is of I-shape in transverse cross section and is made of a multiplicity of graphite fibers extending longitudinally thereof and held in a structurally integral shape by means of a binder or coating material, such as a resin.

18 Claims, 12 Drawing Figures

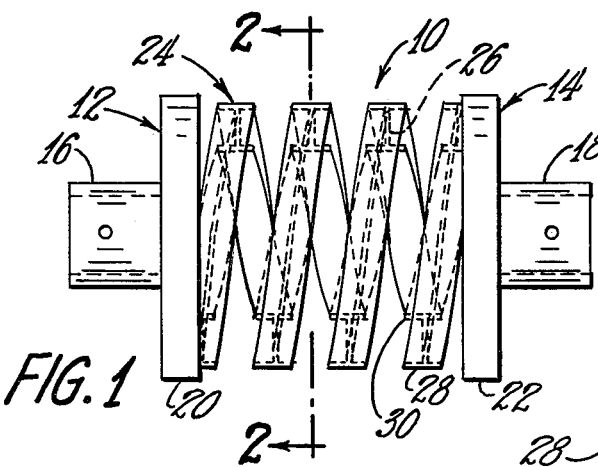
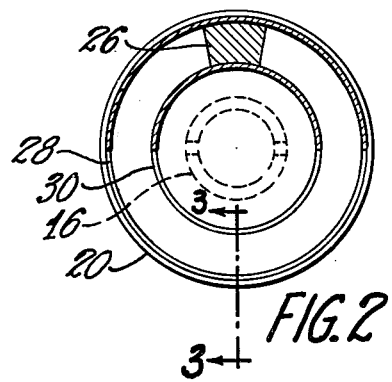
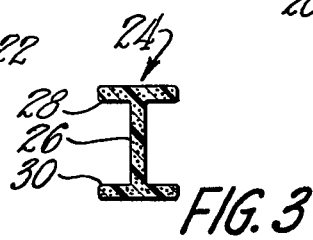
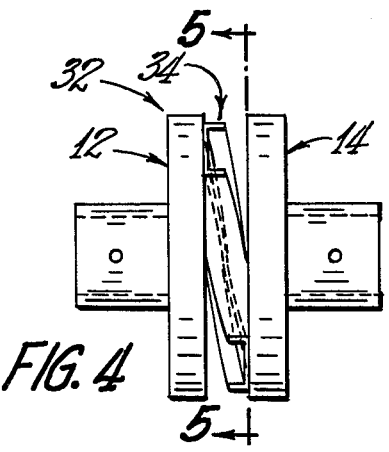
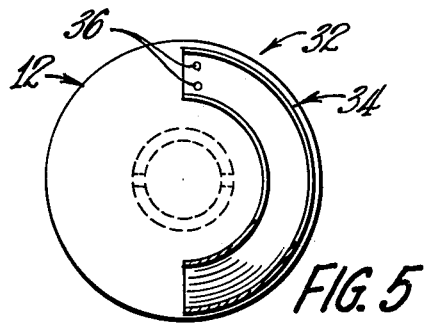
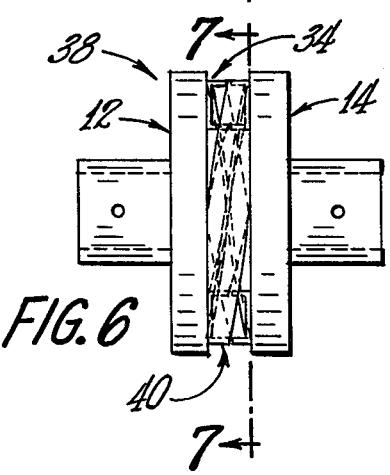
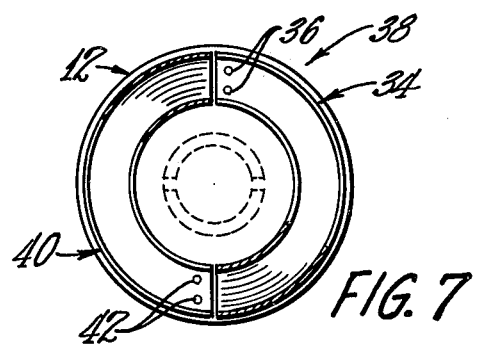

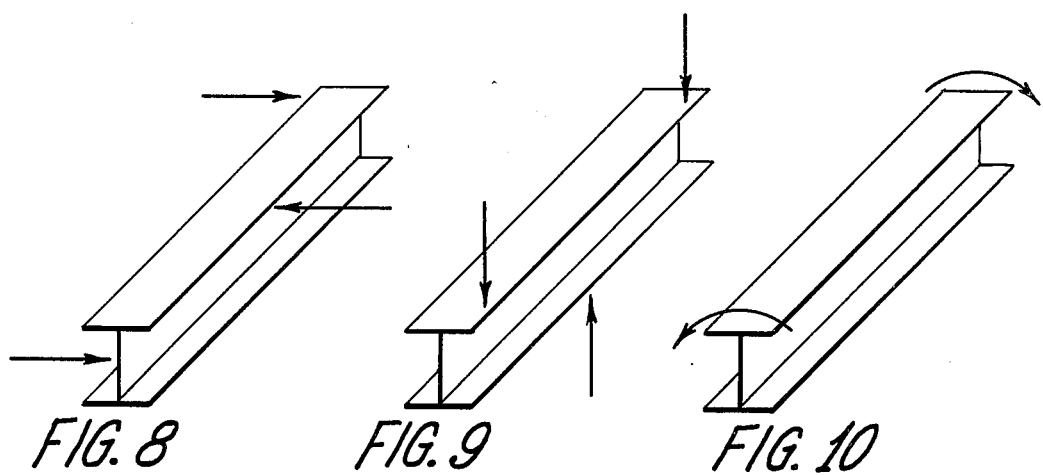
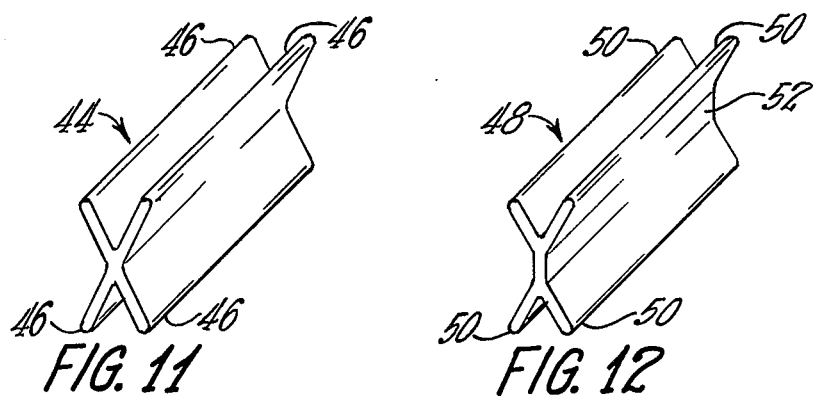

UNIVERSAL JOINT FOR TRANSMITTING TORQUE FROM ONE SHAFT TO ANOTHER

This is a continuation in-part of my United States application Ser. No. 744,885, filed on Nov. 24, 1976, now abandoned.

This invention relates to universal joints and particularly to universal joints for front wheel drive vehicles.

Universal joints of the Cardan type have been long known in the art. These have been commonly used at both ends of the propeller shaft located between the transmission and the differential of conventional rear-drive vehicles. With a single joint of this type, when the shafts associated therewith are angularly misaligned, the angular velocity of the one shaft relative to the other is not always constant. Consequently, Cardan type joints are not suitable for front wheel drives, unless used in pairs. However, there is seldom sufficient room in the length of the drive train for front wheel drive vehicles to incorporate pairs of such universal joints.

Constant velocity universal joints for front wheel drives as well as other applications have long been known in the art. Such joints basically comprise a splined ball and a matching socket which enable torque to be transmitted between angularly-misaligned shafts with constant angular velocity. Such universal joints, however, have been expensive to make, being difficult to machine and also requiring great precision. Such joints have also had other shortcomings, such as deteriorating rapidly when subjected to contaminants.

Another type of constant velocity universal joint that is known in the art is referred to as a bellows type. The bellows universal joints are made of thin, flexible metal of bellows shape, often with the two connected shafts having a ball and socket arrangement within the bellows at the center thereof to prevent axial offset of the shafts relative to one another. A constant velocity universal joint similar to the bellows type is of tubular configuration, usually being made of rubber and sometimes reinforced with a metal bellows within the rubber wall. These joints have also sometimes been reinforced with fibers or wires arranged in a helix of spiral, as shown in U.S. Pat. No. 3,628,352, by way of illustration. Bellows and tubular universal joints have met with limited commercial success, if any, apparently because of their inability to transmit sufficient torque and/or because of a limited service life.

The new constant velocity universal joint according to the instant invention has a number of advantages over those heretofore known. The new joint has an exceptional ability to transmit torque and is believed to provide long service even under severe conditions. It is also almost substantially maintenance free and is not affected by dirt or other contaminants. Further, no intricate machining processor machines are required to produce the new joint. In addition, the new joint has another advantage in that it can be made in a variety of sizes and of different constructions so as to be able to replace a wide variety of existing universal joints.

The new universal joint includes at least two members, one of which is adapted to be attached to an end of one shaft and one of which is adapted to be attached to an end of a second shaft and positioned to face the first member, with the two members being in spaced relationship and positioned to rotate in substantially parallel planes when the shafts to which they are connected are axially aligned and rotated. Each of the members has at least two outer portions or extremities with a flexible, arcuate, elongate bridging element connected between extremities of the first and second members. The elongate element has at least one transverse portion or strip which extends transversely outwardly from an axis or center line of the element in a direction parallel to or at least having a directional component parallel to the axes of the connected shafts, when aligned. The element has at least one additional transverse portion or strip which extends outwardly from a center line in a direction perpendicular to or at least having a directional component perpendicular to the axes of the shafts, when aligned. The shape of the element is designed so as to be more resistant to bending in directions parallel to and perpendicular to the connected shafts, when aligned, than to twisting with the fibers in the element being subjected to lower stress when the element is twisted than when it is bent.

The elongate element preferably extends through an arc of at least 180° and beyond that can extend in a spiral of many turns, the greater number of turns allowing greater angular misalignment of the two shafts. However, a balance must be maintained between the number of turns, the diameter of the bridging element, and its stiffness, as determined by the size and shape of the element and the nature of the material from which it is made. An excess of the number of turns relative to the other characteristics can cause the bridging elements to deform or snake when torque is attempted to be transferred from one of the shafts to the other.

In a preferred form, the bridging element is made of graphite fibers which extend longitudinally thereof and which are held together by a binder in a structurally integral form. The graphite fibers are particularly strong in tension, exhibit a high degree of fatigue resistance, and are capable of stretching.

It is, therefore, a principal object of the invention to provide a universal joint that is substantially maintenance-free, is less affected by dirt or other contaminants, and has a long life.

Another object of the invention is to provide a universal joint that is less expensive and is easier to manufacture than those heretofore known.

A further object of the invention is to provide a universal joint which includes an elongate, curved, flexible bridging element which transmits torque from one shaft to another.

Yet another object of the invention is to provide a universal joint which can be relatively easily made in a variety of sizes and shapes to replace a variety of existing universal joints.

Still another object of the invention is to provide a universal joint which comprises an elongate, helical bridging element connecting two shafts with the elements providing high resistance to bending in directions both parallel and perpendicular to the axes of the connected shafts and low resistance to twisting.

Many other objects and advantages of the invention will be apparent from the following detailed description of preferred embodiments thereof, reference being made to the accompanying drawings, in which:

FIG. 1 is a somewhat schematic side view in elevation of a universal joint embodying the invention;

FIG. 2 is a view in transverse cross section taken along the line 2—2 of FIG. 1;

FIG. 3 is an enlarged view in transverse cross section taken along the line 3—3 of FIG. 2;

FIG. 4 is a view similar to FIG. 1 of a slightly modified universal joint embodying the invention;

FIG. 5 is a view in transverse cross section taken along the line 5—5 of FIG. 4;

FIG. 6 is a view similar to FIGS. 1 and 4 of a further modified universal joint embodying the invention;

FIG. 7 is a view in transverse cross section taken along the line 7—7 of FIG. 6;

FIG. 8 is a diagramatic perspective view of an elongate bridging element illustrating forces tending to bend the element in a direction parallel to axes of shafts connected by the element, when the shafts are aligned;

FIG. 9 is a diagrammatic view similar to FIG. 8 illustrating forces tending to bend the element in a direction perpendicular to the axes of the shafts;

FIG. 10 is a diagrammatic view similar to FIGS. 8 and 9 illustrating torsional forces tending to twist the element;

FIG. 11 is a schematic, perspective view of a modified elongate element in accordance with the invention; and FIG. 12 is a view similar to FIG. 11 of another modified elongate element in accordance with the invention.

Referring particularly to FIGS. 1 and 2, a universal joint embodying the invention is indicated at 10 and is shown ready to be connected to two shafts to enable torque or power to be transmitted from one shaft to the other, even if the shafts are angularly misaligned. The universal joint 10 can be made in a wide variety of sizes, shapes, and constructions whereas to be used in a wide variety of applications and to constitute a replacement for universal joints of a wide variety. The new universal joint is also suitable for low volume, industrial applications because the joint can be made in relatively limited quantities since they do not require special machines or tooling, or long set-up times.

The universal joint 10 includes two members 12 and 14 having means in the form of hubs 16 and 18 at central portions thereof to connect the universal joint to two shafts which may be angularly misaligned, at least at times. The two members 12 and 14 also have outwardly-extending portions 20 and 22 which extend outwardly from the hubs 16 and 18 and rotate in parallel planes when the shafts to which the hubs are affixed are angularly aligned.

A curved elongate bridging element 24 connects extremities or outer edge portions of the members 12 and 14, with the extremities being rotationally displaced in this instance. The element 24 must be highly resistant to bending both in a direction parallel to the axes of the shafts 16 and 18, when aligned, as illustrated in FIG. 8, and also in a direction perpendicular to the axes of the shafts, as illustrated in FIG. 9. At the same time, the elongate element 24 must be low in resistance to torsion or twisting about its longitudinal axis, as illustrated in FIG. 10. The low resistance to twisting enables the turns or coils of the element to move closer together or farther apart, to accommodate angular misalignment and longitudinal movement of the two shafts.

The ratio of bending stiffness to torsional stiffness determines whether the element twists or bends. The parallel bending strength of FIG. 8, parallel to the shaft axes, as measured in pounds per degree of deflection per inch of length, must be a minimum of three times the longitudinal, torsional strength of FIG. 10, as measured in inch-pounds per degree of deflection per inch of length. The perpendicular bending strength of FIG. 9, perpendicular to the shaft axes, must be at least equal to the parallel bending strength.

To achieve the latter resistance, the bridging element must have a portion or strip with a directional component extending outwardly from a horizontal center line of the element in a direction perpendicular to the axes of the shafts, when aligned, to space apart the outer and inner portions of the element to provide the bending resistance. With the bridging element of FIG. 2, when the shaft connected to the hub 16 is a drive shaft and rotates in a counterclockwise direction, as viewed in FIG. 2, the outer portion of the bridging element 24 will be placed in tension and the inner portion in compression. When the same shaft is the drive shaft but is driven in a clockwise direction, as viewed in FIG. 2, the outer portion of the bridging element 24 will be placed in compression and the inner portion in tension.

The bridging element 24 also must have a portion or strip with a directional component extending outwardly from a vertical center line of the element in a direction parallel to the axes of the shafts, when aligned. This provides resistance to transverse bending in a direction parallel to the axis of the shafts.

The element preferably is symmetrical about a horizontal center line parallel to the shaft axes and also a vertical center line perpendicular to the shaft axes so as to provide the same resistance to perpendicular and parallel bending in bothe directions. A portion of the element also should pass through the juncture of the center lines, in contrast to a tube, for example. By placing as much of the mass as possible near the juncture of the center lines of the element, the resistance to twisting can be maintained at a minimum. The parallel and perpendicular portions of the element do not increase in thickness, but preferably are of the same or narrower section as they extend from the center for this reason.

In the preferred form shown, the bridging element 24 includes a transverse web or portion or strip 26 and two transverse flange portions or strips 28 and 30. The element has an I-shape, more accurately a horizontal H-shape, as viewed in transverse cross section. The strip 26 extends transversely of a parallel center line of the element and the strips 28 and 30 extend transversely of a perpendicular center line of the element. At the ends of the bridging element 24 the outwardly-extending portions of the flanges 28 and 30 are tapered from the full width to nothing so that the web 26 can be affixed securely to the members 12 and 14. This can be accomplished by bonding or by any suitable fasteners. The two spaced flange portions 28 and 30 and the web portion 26 provide high resistance to bending of the element 24 in a direction perpendicular to the axes of the shafts while the flanges also provide resistance to buckling or bending in a direction parallel to the axes of the shafts. The element can also twist to accommodate angular misalignment of the shafts. The specific shape shown also makes efficient use of the fibers in the element, which fibers are relatively expensive. In general, a beam of a shape having high resistance to up-and-down bending, or bending in a direction perpendicular to the axes of the shaft, will be suitable for use as the curved bridging element 24, although the resistance to bending in a direction perpendicular to the shaft axes should be at least as great as in a direction parallel to the axes to prevent buckling or snaking of the bridging element and yet provide low resistance to twisting so as to accommodate angular misalignment of the shafts. Thus, for example, a cross section for the bridging element which is of square configuration is not as suitable since it provides excessive resistance to twisting and to angular misalignment of the shafts as compared to the resistance to bending in the other directions.

The bridging element 24 preferably constitutes a multiplicity of graphite fibers which are arranged in parallel relationship and are parallel to the longitudinal extent of the element. The graphite fibers are strong in tension, are fatigue resistant, and can stretch or elongate to some extent and still return to their original length. Such graphite elements are commercially available in tows or untwisted yarn consisting of 2,000, 5,000, or 10,000 fibers or filaments in cross section. The fibers are maintained structurally integral in the desired shape by a matrix or binder of suitable resin or the like. In a preferred form, the bridging element is formed by a pultrusion process in which the fibers are gathered together from a plurality of spools or sources into parallel relationship, and then receive the binder material, as by being passed through a pool thereof. The coated fibers are then led through a heated die of a desired shape, after which they pass through a curing zone or oven to complete the curing process. Before the matrix is completely hardened, the pultrusion can be wound on a mandrel, of a desired diameter, where final curing or hardening occurs, to produce the bridging element 24. The ends of the flanges can be tapered prior to the element being assembled with the members 12 and 14. Rather than the mandrel, the die may be curved or of helical form to produce the bridging element directly therefrom.

As shown in FIG. 1, the curved bridging element 24 is of spiral or helical configuration and extends through about 3½ turns as it connects one outer portion of the member 12 with a rotationally-displaced outer portion of the member 14. This enables a relatively high degree of angular misalignment to be accommodated by the two shafts connected by the hubs 16 and 18. If desired, to prevent excessive axial offset of the shafts, a centering device can be provided within the space defined by the bridging element 24, as shown in U.S. Pat. 3,678,707, for example. If the shafts will move longitudinally relative to one another, the centering device can be readily designed to accommodate such movement without requiring expensive splines and grooves.

Referring to FIGS. 4 and 5, a modified universal joint indicated at 32 includes the two members 12 and 14 with a modified curved bridging element 34 connected between outer portions of the members. The bridging element 34 has the same cross sectional shape as that of the element 24 but extends through an arc of only about 180° in this instance. The end portions of the flanges 28 and 30 are trimmed back so that the web 26 can be affixed to the members 12 and 14, as by suitable fasteners 36 shown in FIG. 5. With the element 34 being of the same size and shape as the element 24, higher torque can be transmitted from one of the members to the other since the element 34 is less subjected to buckling or snaking, and a centering device between the members 12 and 14 is not needed. On the other hand, the element 34 cannot accommodate as great an angular misalignment or longitudinal movement between the shafts as can the element 24.

A further modified universal joint 38 of FIGS. 6 and 7 employs the same members 12 and 14 and also the bridging element 34. In this instance, the universal joint 38 also has another bridging element 40. This element can be of the same cross sectional shape as the element 34 but has its lower end affixed to the member 12 as by fasteners 42 and its upper end affixed to the member 14 by similar fasteners (not shown). Both of the elements 34 and 40 can thus accommodate greater torque transmission but at the same time accommodation of angular misalignment of the shafts is reduced.

The bridging elements 34 and 40 can be made in the same manner as the elements 24 with the element being cut into shorter segments after being produced. On the other hand, if desired, the elements 34 and 40 can be molded or stamped, with similar graphite fibers and binder material being employed.

A segment of a modified elongate bridging element 44 in accordance with the invention is shown in FIG. 11. The element 44 is of an X-shape in transverse cross section. It has four transverse portions or strips 46 which extend with directional components both parallel to and perpendicular to the axes of the shafts which they connect. Like the element 24, the element 44 is preferably symmetrical about a center line parallel to, and a center line perpendicular to, the axes of the shafts. The strips 46 then also extend outwardly from both the vertical and horizontal center lines of the element. The transversely extending portions or strips 46 achieve low resistance to twisting or torsion and at the same time provide high resistance to parallel bending, as illustrated in FIG. 8, and even higher resistance to perpendicular bending, as illustrated in FIG. 9, with the parallel bending strength or resistance preferably being at least three times the torsional strength. Like the element 24, the specific shape of the element 44 makes efficient use of the fibers in the element.

A bridging element 48 of FIG. 12 presents another shape which is suitable for a universal joint in accordance with the invention. The element has the shape of a V and an inverted V connected by a web, as viewed in transverse cross section. The element 48 includes transverse portions or strips 50 which extend with directional components both parallel to and perpendicular to the axes of the shafts, when aligned. The element 48 also has a connecting transverse portion or strip 52 which spaces apart the portions 50 more and increases the perpendicular bending resistance for a given size and spacing of the portions 50. The strips 50 also extend outwardly from a vertical center line of the element 48 and the strips 50 and 52 extend outwardly from a horizontal center line of the element.

For a bridging element whose transverse portions are of similar construction and thickness, the portions should extend in directions parallel to the shaft axes a distance at least two-thirds of the amount of extension in a direction perpendicular to the shaft axes.

Various modifications of the above-described embodiments of the invention will be apparent to those skilled in the art, and it is to be understood that such modifications can be made without departing from the scope of the invention, if they are within the spirit and the tenor of the accompanying claims.

I claim:
1. A universal joint for transmitting torque from one shaft to another shaft, said universal joint comprising a first member, means for attaching a central portion of said first member to one of said shafts to position said first member transversely to the longitudinal extent of said shaft, a second member, means for attaching a central portion of said second member to the other of said shafts to position said second member transversely to the longitudinal extent of said other shaft, and curved bridging means having one end attached to said first member and having another end attached to said second member with an outer portion of said bridging means being placed in tension and an inner portion of said bridging means being placed in compression when torque is transmitted from one shaft to the other shaft in one direction and the outer portion of said bridging means being placed in compression and the inner portion of said bridging means being placed in tension when torque is transmitted from one shaft to the other shaft in the opposite direction, said bridging means having at least one transverse portion which is positioned, as viewed in transverse cross section, with a directional component parallel to the axes of the shafts, when in axial alignment, and further having at least one other transverse portion which is positioned, as viewed in transverse cross section, with a directional component perpendicular to the axes of the shafts, when in axial alignment, the resistance of said bridging means to bending in the direction parallel to the shaft axes, as measured in pounds per degree of deflection per inch of length, being at least three times the resistance to twisting, as measured in inch-pounds per degree of deflection per inch of length.

2. A universal joint according to claim 1 wherein said bridging means is symmetrical with respect to two mutually perpendicular center lines.

3. A universal joint according to claim 1 wherein said bridging means has a horizontal H-shape in transverse cross section.

4. A universal joint according to claim 1 wherein said bridging means has an X-shape in transverse cross section.

5. A universal joint according to claim 1 wherein said bridging means has the shape of a V and an inverted V connected by a web, as viewed in transverse cross section.

6. A universal joint according to claim 1 wherein said transverse portions are of substantially uniform thickness throughout their widths.

7. A universal joint according to claim 1 characterized by said transverse portions being mutually perpendicular.

8. A universal joint for transmitting torque from one shaft to another shaft, said universal joint comprising a first member, means for attaching a central portion of said first member to one of said shafts to position said first member transversely to the longitudinal extent of said shaft, a second member, means for attaching a central portion of said second member to the other of said shafts to position said second member transversely to the longitudinal extent of said other shaft, and curved bridging means having one end attached to said first member and having another end attached to said second member with an outer portion of said bridging means being placed in tension and an inner portion of said bridging means being placed in compression when torque is transmitted from one shaft to the other shaft in one direction and the outer portion of said bridging means being placed in compression and the inner portion of said bridging means being placed in tension when torque is transmitted from one shaft to the other shaft in the opposite direction, said bridging means having at least one strip which extends with a directional component parallel to the axes of the shafts, when in axial alignment, and further at least one other strip which extends with a directional component perpendicular to the axes of the shafts, when in axial alignment, the width of the first strip being at least two-thirds the width of the other strip.

9. A universal joint according to claim 8 wherein said bridging means has a horizontal H-shape in transverse cross section.

10. A universal joint according to claim 8 wherein said bridging means has an X-shape in transverse cross section.

11. A universal joint according to claim 8 wherein said bridging means has the shape of a V and an inverted V connected by a web, as viewed in transverse cross section.

12. A universal joint according to claim 8 characterized by said strips being mutually perpendicular.

13. A universal joint for transmitting torque from one shaft to another shaft, said universal joint comprising a first member, means for attaching a central portion of said first member, to one of said shafts to position said first member transversely to the longitudinal extent of said shaft, a second member, means for attaching a central portion of said second member to the other of said shafts to position said second member transversely to the longitudinal extent of said other shaft, and curved bridging means having one end attached to said first member and having another end attached to said second member with an outer portion of said bridging means being placed in tension and an inner portion of said bridging means being placed in compression when torque is transmitted from one shaft to the other shaft in one direction and the outer portion of said bridging means being placed in compression and the inner portion of said bridging means being placed in tension when torque is transmitted from one shaft to the other shaft in the opposite direction, said bridging means having at least one transverse portion with a directional component extending outwardly from a center line of said bridging means, which is perpendicular to the axes of the shafts, when in axial alignment, and further having at least one other transverse portion with a directional component extending outwardly from a center line of the bridging means, which is parallel to the axes of the shafts, when in axial alignment, the resistance of said bridging means to bending in the horizontal direction being at least three times the resistance to twisting.

14. A universal joint according to claim 13 wherein said bridging means has a horizontal H-shape in transverse cross section.

15. A universal joint according to claim 13 wherein said bridging means has an X-shape in transverse cross section.

16. A universal joint according to claim 13 wherein said bridging means has the shape of a V and an inverted V connected by a web, as viewed in transverse cross section.

17. A universal joint according to claim 13 wherein said transverse portions are of substantially uniform thickness throughout their widths.

18. A universal joint according to claim 13 characterized by said transverse portions being mutually perpendicular.

* * * * *